United States Patent [19]

Hart

[11] Patent Number: 5,693,257
[45] Date of Patent: Dec. 2, 1997

[54] COMPOSITIONS AND METHOD FOR BREAKING WATER-IN-OIL EMULSIONS

[75] Inventor: Paul R. Hart, The Woodlands, Tex.

[73] Assignee: BetzDearborn Inc., Trevose, Pa.

[21] Appl. No.: 568,069

[22] Filed: Dec. 6, 1995

[51] Int. Cl.$^6$ .......................... B01D 17/04; C10G 33/04
[52] U.S. Cl. .................. 252/331; 252/358; 210/708; 208/188; 208/311
[58] Field of Search .................... 252/358, 331; 210/708; 208/188, 311

[56] References Cited

U.S. PATENT DOCUMENTS

| | | | |
|---|---|---|---|
| 2,615,853 | 10/1952 | Kirkpatrick et al. | 252/331 |
| 3,231,382 | 1/1966 | Silver | 430/271.1 |
| 4,407,707 | 10/1983 | Merchant, Jr. et al. | 204/561 |
| 4,551,239 | 11/1985 | Merchant et al. | 252/358 |
| 4,752,552 | 6/1988 | Aoai | 430/191 |
| 4,949,743 | 8/1990 | Broom | 137/13 |
| 5,075,028 | 12/1991 | Hudson | 252/182.14 |
| 5,205,964 | 4/1993 | Stephenson et al. | 252/340 |
| 5,250,174 | 10/1993 | Hart | 208/188 |
| 5,256,305 | 10/1993 | Hart | 210/708 |
| 5,271,841 | 12/1993 | Hart | 210/708 |
| 5,431,452 | 7/1995 | Chang et al. | 283/95 |

Primary Examiner—Richard D. Lovering
Assistant Examiner—Daniel S. Metzmaier
Attorney, Agent, or Firm—Alexander D. Ricci; Philip H. Von Neida

[57] ABSTRACT

Compositions of an alkylphenol-formaldehyde resin and poly(alkylene glycol) are effective at breaking water-in-oil emulsions in a liquid hydrocarbon. Preferably, the composition is employed in a crude oil desalting system.

15 Claims, No Drawings

COMPOSITIONS AND METHOD FOR BREAKING WATER-IN-OIL EMULSIONS

FIELD OF THE INVENTION

The present invention relates to methods and compositions for breaking water-in-oil emulsions in hydrocarbon liquids. More particularly, the present invention relates to methods and compositions for breaking water-in-oil emulsions in a crude oil desalting process.

BACKGROUND OF THE INVENTION

In the manufacture, handling, transportation and/or use of various organic substances, corrosion problems occur due to the presence of varying amounts of water in solution or in suspension in the organic substances. Illustrative organic substances include particularly hydrocarbon distillates such as gasoline, jet fuel, kerosene, lubricating oil, fuel oil, diesel oil, crude oil, etc. Other specific oils include cutting oils, soluble oils, slushing oils, rolling oils, etc. which may be of mineral, animal or vegetable origin. Other organic substances include various coating compositions as grease, wax, household oil, paints, lacquer, etc. Still other organic substances include alcohols, ketones, esters, ethers, dioxane, amino compounds, amides, etc. In spite of all reasonable and practical precautions which are taken to avoid the presence of water, an appreciable quantity of water separation is found as a film or in minute droplets in the pipeline or on container walls or even in small pools at the bottom of the container. This results in corrosion of the metal surfaces and contamination of the organic substance by the corrosion products.

For example, the crude petroleum charge entering a petroleum refinery contains salts such as magnesium, sodium and calcium chlorides. These salts are present in most petroleum charges in amounts from about 3 to 200 pounds per thousand barrels of crude oil. These salts are unstable at elevated temperatures. If allowed to remain with the petroleum charge throughout the various stages of the refinery operation the salts will disassociate and the chloride ions will hydrolyze to form hydrochloric acid. Hydrochloric acid, as well as organic acids which are present to varying degrees in the petroleum crude contribute to corrosion in the main fractionator unit and other regions of the refinery system where temperatures are elevated and where water condenses.

Crude oil desalting is a common emulsion breaking method where an emulsion is first intentionally formed. Water is added in an amount of approximately 5% to 10% by volume of crude. The added water is intimately mixed with the crude oil to contact the impurities therein thereby transferring these impurities into the water phase of the emulsion. The emulsion is usually resolved with the assistance of emulsion breaking chemicals, characteristically surfactants, and by the known method of providing an electrical field to polarize the water droplets. Once the emulsion is broken, the water and petroleum media form distinct phases. The water phase is separated from the petroleum phase and subsequently removed from the desalter. The petroleum phase is directed further downstream for processing through the refinery operation.

Emulsion breakers, also called demulsifiers, are usually fed to the crude so as to modify the stabilizer film formed initially at the oil/water interface. These emulsion breakers are typically surfactants that migrate to the interface allowing droplets of water (or oil) to coalesce more readily. The demulsifiers reduce residence time required for good separation of oil and water.

DESCRIPTION OF THE RELATED ART

U.S. Pat. No. 5,205,964, Stephenson et al., teaches methods for breaking crude oil emulsions using as water-in-oil emulsion breakers ethylene carbonate adducts of alkylphenol-formaldehyde resins. This adduct is obtained by reacting, in anhydrous conditions and for at least one hour an alkyl substituted phenol-formaldehyde polymer of molecular weight of 1000 to 100,000 with ethylene carbonate.

U.S. Pat. No. 5,250,174, Hart, teaches methods for breaking water-in-oil emulsions in hydrocarbon liquids with a quaternary alkyl amine ethoxylate compound. U.S. Pat. No. 5,256,305, Hart, teaches methods for resolving a water-in-oil emulsion in a crude oil desalting system wherein the crude oil forms a reverse (oil-in-water) emulsion at a temperature of 90° to 150° C. The methods comprise addition of an oil based demulsifier directly to the wash water followed by mixing of the demulsifier with wash water prior to addition to the crude oil, thereby increasing the water removal capability of the demulsifier. The demulsifier is selected from the group consisting of alkoxylates of alkylphenols, alkylamines, alkylols and/or polyols with or without cross-linking with aldehydes, di- or multifunctional acids, epoxides and isocyanates.

DETAILED DESCRIPTION OF THE INVENTION

The present invention relates to methods and compositions for breaking a water-in-oil emulsion in a hydrocarbon liquid comprising adding to the hydrocarbon liquid a sufficient emulsion breaking amount of a combination of a (non-alkoxylated) alkylphenol-formaldehyde resin and a poly(alkylene glycol).

The alkylphenol-formaldehyde resins of the present invention have weight average molecular weights of about 500 to about 5000. The alkyl group may be linear or branched and have 1 to about 24 carbon atoms with a range of about 4 to about 9 atoms preferred.

The poly(alkylene glycol) compounds of the present invention have weight average molecular weights in the range of about 200 to about 2000. Preferably, the weight average molecular weight is about 600. The alkylene group may be linear or branched and have about 2 to 4 carbon atoms. Preferably the alkylene group is ethylene.

The compositions of the present invention prove surprisingly effective at breaking water-in-oil emulsions in hydrocarbon liquids. This activity is unexpected as neither ingredient alone demonstrates as much efficacy as a demulsifier in hydrocarbon liquids.

The compositions of the present invention may be added to the hydrocarbon liquid at any convenient location during processing, transport or storage where it is desirable to remove emulsified water.

The total amount of alkylphenol-formaldehyde resin and poly(alkylene glycol) used in the methods of the present invention is that amount which is sufficient to break a water-in-oil emulsion. This amount will vary according to the conditions to which the hydrocarbon liquid is being subjected such as temperature as well as the particle size of the emulsion.

Preferably, the total amount of the composition added to the liquid hydrocarbon ranges from about 0.1 part per million to about 100 parts per million parts of hydrocarbon liquid. More preferably, the total amount added ranges from about 0.5 parts to about 20 parts per million parts of liquid hydrocarbon.

The alkylphenol-formaldehyde resin and poly(alkylene glycol) can be added to the liquid hydrocarbon or the wash water by any conventional means. The composition can be added as a combination containing both components or can be added as separate components. In either situation, the components can be added to the liquid hydrocarbon as a solution using a suitable solvent that is compatible with both the component or components and the liquid hydrocarbon. This is preferably a moderately polar organic solvent such as a higher alcohol or aromatic hydrocarbon, like xylene. The components can be added to the wash water as a solution using a mutually compatible solvent such as water and/or a lower alcohol. When the individual components are added separately, it is desirable to add the alkylphenol-formaldehyde resin to the wash water in an aqueous solvent and the poly(alkylene glycol) to the oil in an organic solvent. This will tend to drive each component towards the water-oil interface.

The compositions of the present invention are effective at breaking water-in-oil emulsions in a variety of hydrocarbons including but not limited to gasoline, kerosene, jet fuel, lubricating oil, fuel oil, diesel oil, gas oil and crude oil. The compositions of the present invention are especially useful at the desalter in a refinery which processes crude oil.

The ratio of alkylphenol-formaldehyde resin to poly (ethylene glycol) may be in the range of 1–2 mole of the phenol in the resin to 1–6 moles of hydroxyl on the poly (alkylene glycol). Preferably, the ratio is 1 mole of the phenol in the resin to 1 mole of hydroxyl in the poly (alkylene glycol).

The invention will now be described with reference to a number of specific examples which are to be regarded solely as illustrative, and not as restricting the scope of the invention.

Method for Selecting Demulsifiers Using the Desalter Electric Field and Desalter Mix Valve Simulator (DEF & DMVS)

This method is used to select demulsifiers for refinery crude oil desalters. Chemical demulsifiers are added to the crude oil and/or wash water, these are mixed together at a temperature and with a shear and duration approximating that of a desalter mix valve, then the mixture (an emulsion) is allowed to settle at a temperature and electric field strength and for a residence time approximating that of a desalter. In all cases the same oil/water/chemical ratio added to the desalter system is used, and the amount of water which drops out of the emulsion as a function of time is recorded and averaged. The treatment with the highest mean water drop and least residual emulsion is selected.

Reagents

Demulsifiers, oil-based, 2% product (or 0.6% active) dilutions in "Organic EB Solvent" (below).

Demulsifiers, water-based, 2% product (or 0.3% active) dilutions in "Aqueous EB Solvent" (below).

Demulsifiers, emulsion-based, 0.5% product (or 0.3% active) dilutions in Aqueous EB Solvent.

Organic EB Solvent: 3% Xylene+12% Hexylene Glycol in HAN.

Aqueous EB Solvent: 1% Hexylene Glycol in DI water.

Emulsification

1. Add oil, water and chemical(s) to the settling tubes. To add a water-based chemical to the oil: add oil and chemical, cap and blend, then add water (with pipette). To add any chemical to the water: add water and chemical, swirl by hand, then add oil. To add oil-based chemical to the oil: add water, oil then chemical. The relative amounts of water, oil and chemical added should be equal to that proposed for use in the process. The total volume of fluid should be 100 mL.

2. Seal the tubes with the mixing caps. Place tubes in rack in oil bath set at process temperature (up to 302° F., the heater limit). Heat for at least 18 minutes.

3. Set mixing speed and duration on blender and timer, respectively. One to two seconds is a reasonable duration. One (krpm×secs) per psi process mix valve differential pressure is reasonable. These should be adjusted, time permitting, to achieve at most 20% oil-phase break initially and at least 80% oil-phase break after two oil-phase residence times of the desalter, where the oil-phase break includes any oil-in-water emulsions not counted as "water drop". Ideally, the first test should be run with a "control" treatment of known desalter performance characteristics, and the test conditions adjusted to simulate that performance. For example, if the current product leaves oil in the desalter effluent brine, it should break slow or leave residual emulsion in the test. If it doesn't, start over and mix harder and/or longer—do not change conditions in the middle of a test series that you want to be comparable.

4. Set beeping repeat cycle timer for 7.5 seconds. Turn the electric field on. Put voice recorder on "record". At 7.5 second intervals, remove each tube sequentially, invert it on the blender base, emulsify the contents, and (at each timer beep) return it to the bath. Use appropriate hand protection. Start both the repeat cycle timer and elapsed time timer when the first tube is placed back in the bath.

Demulsification

1. Observe and record the water drop (WD, the amount of non-emulsified water at the bottom of the tube) for each tube, to the nearest 0.1 mL, in the same order and at the same intervals as blended (i.e., at each beep), starting at 60 seconds from blending (i.e., immediately after placing the eighth tube back in the bath). If the interface is non-planar, spongy, obscured by oil on the glass or otherwise indistinct, strive to estimate the total volume of water reasonably free from and free of oil, but do not take longer than 7.5 seconds to do this, and be consistent. (This first reading should be labeled the 1 minute reading).

2. Continue to take WD readings at geometric intervals, such as 1 min. (immediately after all blendings), 2 min. (immediately after all 1st readings), 4 min. (1 min. after all 2nd readings), 8, 16, 32 and 64 minutes, from the start. (Let the repeater keep beeping while the stop-watch tracks the total elapsed time.) Take 7–8 readings over a duration of 2–6 times the oil phase residence time (i.e., ½ to 1 water phase residence time) of the desalter. When reading intervals are long enough, play back and write down the voice recorded readings.

3. After the last WD (or WC) reading, record the volume of any residual emulsion layers for each tube along with a general description, including type (O/W, W/O, O/W/O, W/O/ W), color (blond, brown, gray), optical density (opaque, translucent) and texture or porosity (smooth or creamy, spongy or wispy, fisheyes or baggy, stringy or ragged, mottled or marbled). Also record anything which made reading the WD difficult, such as oil or emulsion coating the glass (OOG, EOG), or disconnected blobs of water hung up on the glass (WOG).

4. Average all the WD readings for each tube and record, to the nearest 0.01 mL, as "Mean WD". A difference greater than 0.1 mL should generally be considered statistically significant. (This will vary somewhat with the difficulty of reading the tubes.)

Testing was performed on a western U.S. crude oil comprising 90% heavy naphthenic crude, 5% offshore sour crude and 5% naphtha. The parameters employed in this test are defined below:

| Emulsification | Test #1 | Demulsification | Test #1 |
|---|---|---|---|
| w/o mix ratio | 7:93 | tester type | DEFS |
| mixer type | DMVS | test tube type | baffled |
| mixer power | full | beaker add. pt. | oil |
| mixer speed | 10 k rpm | breaker dilution | 2% |
| mixing time | 1 sec | breaker strength | 30% active |
| mixing temp. | 300° F. | bath temp. | 300° F. |
| volume mixed | 100 mL | electric field | full |

The results of this testing are reported in Table I below.

TABLE I

| Treatment | Water Drop Readings (mLs at min. indicated) | | | | | | | Mean | Residual |
|---|---|---|---|---|---|---|---|---|---|
| (ppm active) | 1 | 2 | 4 | 8 | 16 | 32 | 64 | WD | Emulsion |
| Blank | 0 | 0 | 0 | 1.0 | 1.6 | 2.5 | 3.5 | 1.23 | 1.0 |
| 3(4.5) | 0 | 2 | 1.8 | 3.0 | 35 | 4.0 | 4.5 | 2.43 | 1.0 |
| 4(4.5) | 0 | 4 | 1.6 | 2.7 | 3.5 | 4.0 | 4.5 | 2.39 | 1.0 |
| 5(4.5) | 0 | 2 | 1.6 | 3.5 | 4.0 | 4.5 | 5.5 | 2.76 | 1.0 |
| 6(4.5) | 0 | 2 | 1.6 | 3.0 | 3.5 | 4.0 | 4.5 | 2.40 | 1.0 |

Treatment 3 is $NR_{10}$
Treatment 4 is $NR_{10}$ and PEG 400; 37:63
Treatment 5 is $NR_{10}$ and PEG 600; 44:56
Treatment 6 is $NR_{10}$ and PEG 900; 37:63
$NR_x$ = nonylphenol-formaldehyde resin of x degrees of polymerization.
PEG XOO = Poly(ethylene glycol) of x hundred molecular weight.

The resin and PEG blend was compared to PEG alone on a different western U.S. crude oil. The parameters and results of this test are summarized in Table II.

| Emulsification | Test #2 | Demulsification | Test #2 |
|---|---|---|---|
| w/o mix ratio | 9:91 | tester type | DEFS |
| mixer type | DMVS | test tube type | baffled |
| mixer power | full | beaker add. pt. | oil |
| mixer speed | 7 k rpm | breaker dilution | 2% |
| mixing time | 1 sec | breaker strength | 30% active |
| mixing temp. | 280° F. | bath temp. | 280° F. |
| volume mixed | 100 mL | electric field | full |

TABLE II

| Treatment | Water Drop Readings (mLs at min. indicated) | | | | | | Mean |
|---|---|---|---|---|---|---|---|
| (ppm active) | 1 | 2 | 4 | 8 | 16 | 32 | 64 | WD |
| Blank | 0 | 0.5 | 1.2 | 2.0 | 3.5 | 4.7 | 5.5 | 2.49 |
| 1(6.0) | 0.2 | 1.2 | 3.0 | 3.5 | 4.5 | 6.0 | 7.0 | 3.67 |
| 2(6.0) | 0.2 | 1.0 | 2.5 | 3.0 | 4.5 | 6.0 | 6.5 | 3.39 |

Treatment 1 is $NR_{10}$ and PEG 600; 44:56
Treatment 2 is PEG 600

The resin, the PEG, and their blend were compared side by side on a western Canadian crude oil. The parameters and results of this test are summarized in Table III.

| Emulsification | Test #3 | Demulsification | Test #3 |
|---|---|---|---|
| w/o mix ratio | 5:95 | tester type | DEFS |
| mixer type | DMVS | test tube type | baffled |
| mixer power | full | beaker add. pt. | oil |
| mixer speed | 10 k rpm | breaker dilution | 2% |
| mixing time | 1 sec | breaker strength | 30% active |
| mixing temp. | 285° F. | bath temp. | 285° F. |
| volume mixed | 100 mL | electric field | full |

TABLE III

| Treatment | Water Drop Readings (mLs at min. indicated) | | | | | | | Mean | Residual |
|---|---|---|---|---|---|---|---|---|---|
| (ppm active) | 1 | 2 | 4 | 8 | 16 | 32 | 64 | WD | Emulsion |
| 3(4.8) | 2.0 | 3.0 | 3.2 | 3.5 | 3.7 | 4.0 | 4.2 | 3.37 | 1.0 |
| 4(4.8) | 2.0 | 3.2 | 3.5 | 3.7 | 4.0 | 4.0 | 4.2 | 3.51 | 1.0 |
| 5(4.8) | 1.8 | 2.5 | 3.0 | 3.2 | 3.5 | 3.7 | 4.0 | 3.10 | 10 |

Treatment 3 is $NR_{10}$
Treatment 4 is $NR_{10}$ and PEG 60; 44.56
Treatment 5 is PEG 600

Further testing was performed on a southern U.S. crude utilizing the following test parameters:

| Emulsification | Test #4 | Demulsification | Test #4 |
|---|---|---|---|
| w/o mix ratio | 5:95 | tester type | DEFS |
| mixer type | DMVS | test tube type | baffled |
| mixer power | full | beaker add. pt. | oil |
| mixer speed | 4 k rpm | breaker dilution | 2% |
| mixing time | 1 sec | breaker strength | 30% active |
| mixing temp. | 280° F. | bath temp. | 280° F. |
| volume mixed | 100 mL | electric field | full |

The results of this testing are reported in Table IV.

TABLE IV

| Treatment | Water Drop Readings (mLs at min. indicated) | | | | | | | Mean | Residual |
|---|---|---|---|---|---|---|---|---|---|
| (ppm active) | 1 | 2 | 4 | 8 | 16 | 32 | 64 | WD | Emulsion |
| Blank | 0.5 | 1.8 | 2.5 | 3.2 | 3.5 | 3.7 | 4.2 | 2.77 | 0 |
| 5(4.8) | 1.2 | 2.0 | 3.0 | 3.7 | 4.0 | 4.5 | 4.7 | 3.30 | 0 |
| 6(4.8) | 1.2 | 2.5 | 3.7 | 4.0 | 4.2 | 4.5 | 4.7 | 3.54 | 0 |
| 7(4.8) | 1.2 | 2.5 | 3.7 | 4.2 | 4.5 | 4.7 | 5.0 | 3.69 | 0 |
| 8(4.8) | 1.2 | 2.7 | 3.7 | 4.2 | 4.5 | 4.7 | 5.0 | 3.71 | 0 |
| 9(4.8) | 1.2 | 2.5 | 3.7 | 4.2 | 4.5 | 4.7 | 5.0 | 3.69 | 0 |

Treatment 5 is $NR_{10}$
Treatment 6 is $NR_{10}$ and PEG 200; 54:46
Treatment 7 is $NR_{10}$ and PEG 400; 37:63
Treatment 8 is $NR_{10}$ and PEG 600; 44:56
Treatment 9 is $NR_{10}$ and PEG 900; 37:63

The resin and PEG blend was compared to PEG alone on Ratawi crude used at another southern refinery. The test parameters and results are presented below in Table V.

| Emulsification | Test #5 | Demulsification | Test #5 |
|---|---|---|---|
| w/o mix ratio | 5:95 | tester type | DEFS |
| mixer type | DMVS | test tube type | baffled |
| mixer power | full | beaker add. pt. | oil |
| mixer speed | 7 k rpm | breaker dilution | 2% |
| mixing time | 1 sec | breaker strength | 30% active |
| mixing temp. | 280° F. | bath temp. | 280° F. |
| volume mixed | 100 mL | electric field | full |

TABLE V

| Treatment | Water Drop Readings (mLs at min. indicated) | | | | | | | Mean |
|---|---|---|---|---|---|---|---|---|
| (ppm active) | 1 | 2 | 4 | 8 | 16 | 32 | 64 | WD |
| Blank | 0.2 | 0.8 | 1.6 | 2.0 | 3.0 | 3.5 | 3.7 | 2.11 |
| 1(2.4) | 0.2 | 1.2 | 2.0 | 2.5 | 3.2 | 3.5 | 4.5 | 2.44 |
| 2(2.4) | 0.2 | 1.0 | 2.0 | 2.2 | 3.0 | 3.5 | 4.0 | 2.27 |

Treatment 1 is $NR_{10}$ and PEG 600; 44:56
Treatment 2 is PEG 600

Further testing was performed on a different southern U.S. crude oil utilizing the following test procedures:

| Emulsification | Test #6 | Demulsification | Test #6 |
|---|---|---|---|
| w/o mix ratio | 5:95 | tester type | DEFS |
| mixer type | DMVS | test tube type | baffled |
| mixer power | full | beaker add. pt. | oil |
| mixer speed | 7 k rpm | breaker dilution | 2% |
| mixing time | 1 sec | breaker strength | 30% active |
| mixing temp. | 250° F. | bath temp. | 250° F. |
| volume mixed | 100 mL | electric field | full |

The results of this testing are reported in Table VI.

TABLE VI

| Treatment | Water Drop Readings (mLs at min. indicated) | | | | | | | Mean | Residual |
|---|---|---|---|---|---|---|---|---|---|
| (ppm active) | 1 | 2 | 4 | 8 | 16 | 32 | 64 | WD | Emulsion |
| Blank | 0.1 | 0.6 | 1.0 | 2.2 | 2.5 | 2.7 | 3.2 | 1.76 | 0 |
| 4(3.6) | 0.1 | 0.2 | 0.8 | 2.5 | 3.5 | 4.0 | 4.2 | 2.19 | 0 |
| 5(3.6) | 0.1 | 0.4 | 1.8 | 2.7 | 3.7 | 4.0 | 4.2 | 2.41 | 0 |
| 6(3.6) | 0.2 | 1.0 | 2.0 | 3.5 | 4.0 | 4.5 | 4.7 | 2.84 | 0 |

Treatment 4 is $NR_{10}$
Treatment 5 is $NR_{10}$ and PEG 200; 54:46
Treatment 6 is $NR_{10}$ and PEG 400; 44:56

Further testing was performed on a southern U.S. sour crude oil utilizing the following test procedures:

| Emulsification | Test #7 | Demulsification | Test #7 |
|---|---|---|---|
| w/o mix ratio | 5:95 | tester type | DEFS |
| mixer type | DMVS | test tube type | baffled |
| mixer power | full | beaker add. pt. | oil |
| mixer speed | 7 k rpm | breaker dilution | 2% |
| mixing time | 1 sec | breaker strength | 30% active |
| mixing temp. | 282° F. | bath temp. | 282° F. |
| volume mixed | 100 mL | electric field | full |

The results of this testing are reported in Table VII.

TABLE VII

| Treatment | Water Drop Readings (mLs at min. indicated) | | | | | | | Mean | Residual |
|---|---|---|---|---|---|---|---|---|---|
| (ppm active) | 1 | 2 | 4 | 8 | 16 | 32 | 64 | WD | Emulsion |
| Blank | 0.0 | 0.2 | 0.4 | 0.8 | 1.0 | 1.4 | 1.6 | 0.77 | 1.0 |
| 4(1.8) | 0.2 | 0.2 | 0.4 | 0.6 | 1.0 | 1.2 | 3.0 | 0.94 | 1.0 |
| 5(1.8) | 0.2 | 0.2 | 0.4 | 0.8 | 1.0 | 1.2 | 2.5 | 0.90 | 1.5 |
| 6(1.8) | 0.2 | 0.4 | 0.6 | 0.8 | 1.0 | 1.2 | 2.7 | 0.99 | 1.5 |

Treatment 4 is $NR_{10}$
Treatment 5 is $NR_{10}$ and PEG 200; 54:46
Treatment 6 is $NR_{10}$ and PEG 400; 44:56

DISCUSSION

Tables I, IV, VI, and VII demonstrate that compositions of nonylphenol-formaldehyde resin having about 10 degrees of polymerization when combined with poly(ethylene glycol) having molecular weight of either 200, 400, 600 or 900 were effective at breaking water-in-oil emulsions in a various crude oils and generally more effective than the nonylphenol-formaldehyde resin used by itself. The combination with 600 MW PEG was always better than the resin by itself. Tables II and V demonstrate that the combination was effective and worked better than the PEG 600 by itself. Table II demonstrates that the combination was more effective than either individual component used alone.

These results further demonstrate that ratios of 54:46 to 37:63 of alkylphenol-formaldehyde resin to poly(ethylene glycol) are effective in the methods of the present invention.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for breaking a water-in-oil emulsion in a hydrocarbon liquid comprising adding to said hydrocarbon liquid a sufficient emulsion breaking amount of a combination of a non-alkoxylated alkylphenol-formaldehyde resin and a poly(alkylene glycol) having an alkylene group which is linear or branched and has about 2 to 4 carbon atoms.

2. The method as claimed in claim 1 wherein said alkylphenolformaldehyde resin has a molecular weight of from about 500 to about 5000.

3. The method as claimed in claim 1 wherein said alkyl group on said alkylphenol is linear or branched and has about 1 to about 24 carbon atoms.

4. The method as claimed in claim 3 wherein said alkyl group is linear or branched and has about 4 to about 9 carbon atoms.

5. The method as claimed in claim 1 wherein said alkylene groups is ethylene.

6. The method as claimed in claim 5 wherein said poly(ethylene glycol) has a molecular weight of about 200 to about 2000.

7. The method as claimed in claim 6 herein said poly (ethylene glycol) has a molecular weight of about 600.

8. The method as claimed in claim 1 wherein said hydrocarbon liquid is undergoing processing.

9. The method as claimed in claim 8 wherein said processing is crude oil desalting.

10. The method as claimed in claim 1 wherein said liquid hydrocarbon is being transported or stored.

11. The method as claimed in claim 1 wherein said combination is added to said liquid hydrocarbon liquid in an amount ranging from about 0.1 parts to about 100 parts per million parts of liquid hydrocarbon.

12. The method as claimed in claim 1 wherein said combination is added to said liquid hydrocarbon in an amount ranging from about 0.5 parts to about 20 parts per million parts of liquid hydrocarbon.

13. The method as claimed in claim 1 wherein said combination is added to said liquid hydrocarbon in a solvent.

14. The method as claimed in claim 13 wherein said solvent is heavy aromatic hydrocarbon.

15. The method as claimed in claim 1 wherein said liquid hydrocarbon is selected from the group consisting of gasoline, kerosene, jet fuel, lubricating oil, fuel oil, diesel oil, gas oil, and crude oil.

* * * * *